Dec. 5, 1950     B. A. BECK, SR     2,532,754
ADJUSTABLE COUPLING
Filed Oct. 15, 1948     2 Sheets-Sheet 1
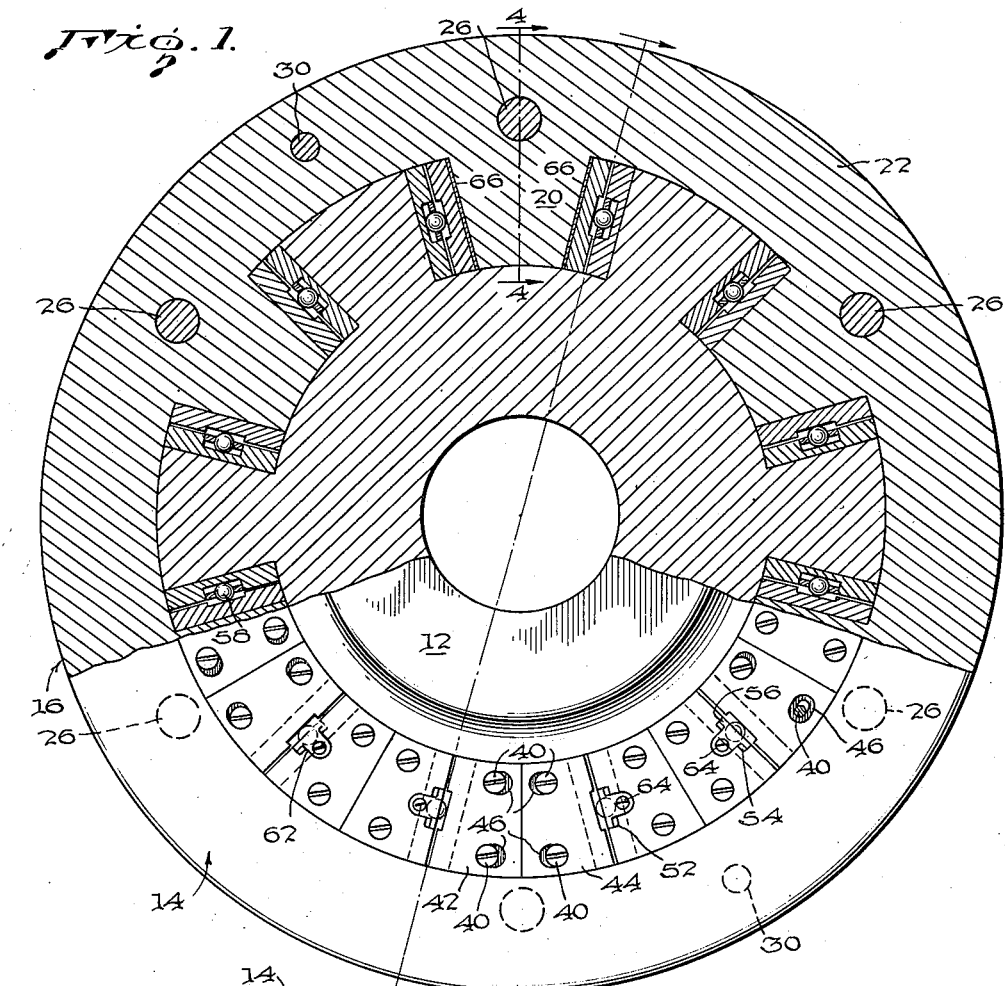
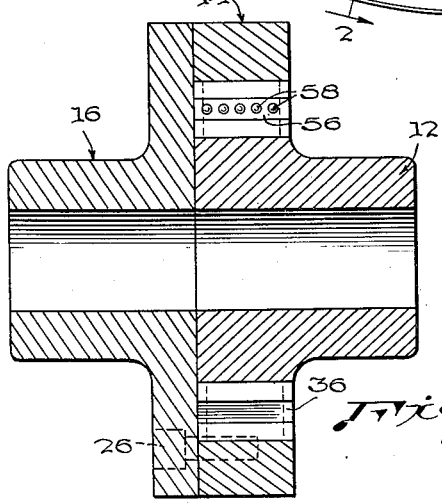
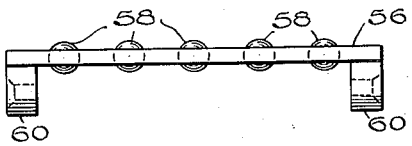
INVENTOR.
B. A. BECK, SR.
BY
Leech + Radue
ATTORNEYS

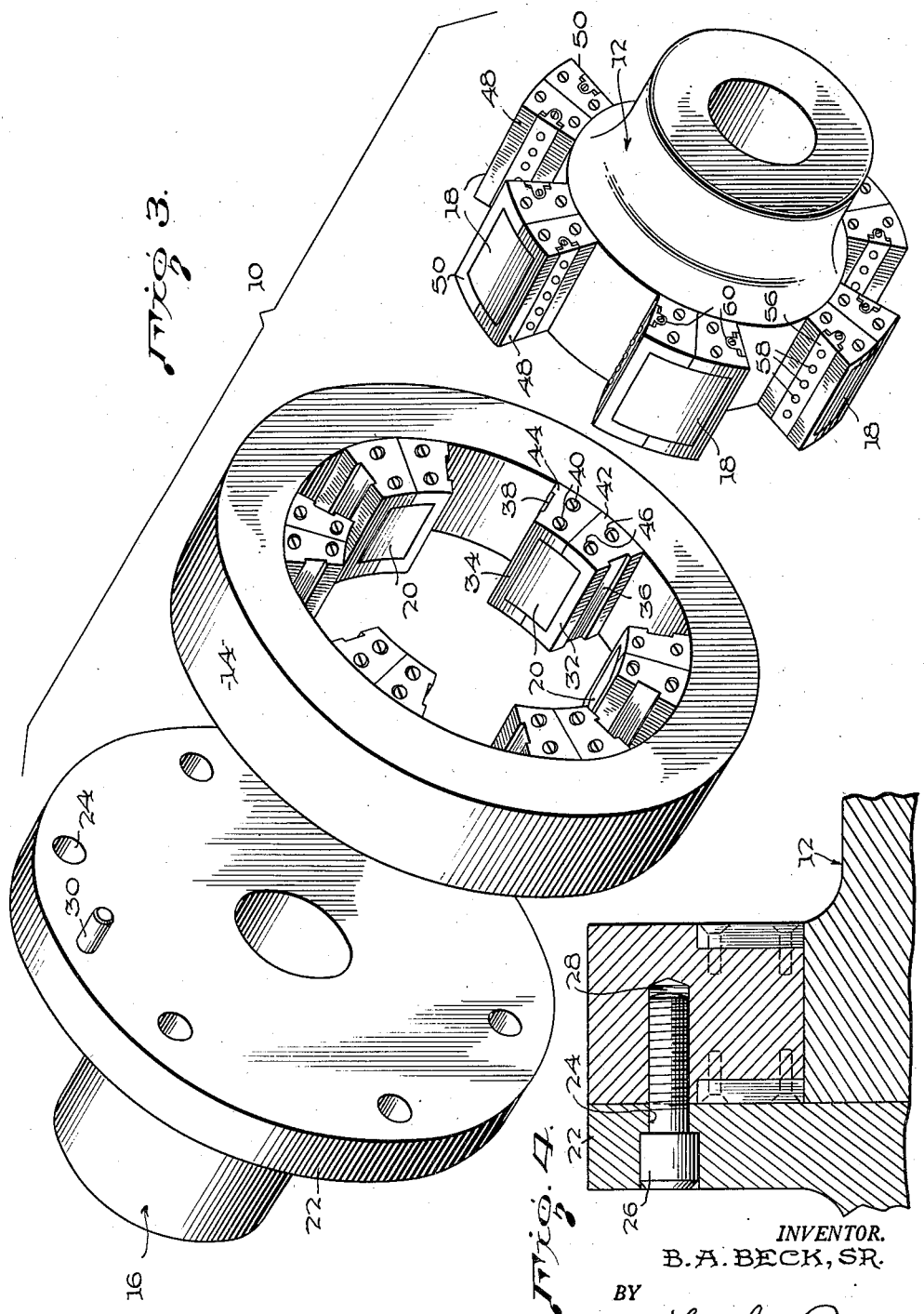

Patented Dec. 5, 1950

2,532,754

UNITED STATES PATENT OFFICE 2,532,754

ADJUSTABLE COUPLING

Bartlett A. Beck, Sr., Portsmouth, Va.

Application October 15, 1948, Serial No. 54,639

7 Claims. (Cl. 64—23)

This invention relates to adjustable couplings of the jaw type and more particularly to a coupling of this type having anti-friction and wear compensating means between contacting teeth surfaces.

The problem to which this invention is addressed has arisen in connection with the couplings now used for heavy duty marine propulsion service. These previously used couplings have large continuous areas of contacting surface between the tooth faces which in normalizing themselves are capable of exerting great force on the connected parts of the turbine, reduction gear and quill shaft with which they are ordinarily connected. With couplings having continuous contact surfaces of this nature the provisions for supplying lubricating oil are limited and uncertain. For these reasons, among others, there have been many instances of galled, worn and burned coupling surfaces requiring time-consuming reconditioning or complete renewal of the coupling. A secondary aspect of the problem is found in the damage to driving and driven components when couplings are not maintained at design clearances and too great freedom of movement is permitted.

It is the principal object of this invention to overcome this problem by providing a coupling that is capable of freer accommodating movement or self-normalizing as a spline joint.

Another object of the invention is to provide a jaw coupling having adjustable and renewable contacting surfaces.

A further object of the invention resides in the provision of a jaw coupling with less friction between its driving surfaces for easier accommodation of movement by the main shaft and improved access to lubrication.

More specifically, it is an object of the invention to provide a coupling which will allow the quill shaft, reduction gear pinion shaft and main engine rotor shaft to float more easily in response to shaft expansions, variable thrust conditions and unbalanced axial loads due to variations in steam pressures and temperatures.

A still further object of the invention resides in the provision of a jaw coupling having intermeshed teeth with ball bearing inserts contacting hardened surfaces of adjustable gibs.

These and other features of improvement contributing to efficiency in operation and ease of maintenance will be apparent from the following detailed description of a preferred embodiment of the invention taken in connection with the accompanying drawings, in which:

Fig. 1 is a front elevation of the coupling with certain parts broken away and sectioned;

Fig. 2 is a reduced scale longitudinal section of the coupling of Fig. 1, taken on the line 2—2;

Fig. 3 is an exploded perspective view showing the principal parts of the coupling in position for assembly;

Fig. 4 is a fragmentary sectional view taken on the line 4—4 of Fig. 1 and showing a detail of assembly; and Fig. 5 is a side elevation to enlarged scale of a bearing insert.

In Fig. 3, a coupling 10 in accordance with the teachings of this invention is illustrated as comprising interfitting male and female coupling members 12 and 14 to which a drive shaft coupling means 16 is adapted to be connected. The male coupling and drive member 12 includes six uniformly spaced radial jaw teeth 18 which engage the correspondingly spaced radial jaw teeth 20 of the coaxial female coupling member 14. The drive shaft coupling means 16 is formed with a flange plate 22 corresponding in diameter to the circular coupling member 14. Six circumferentially spaced holes 24 in the flange plate 22 can be used to secure it to the member 14 by machine screws 26 engaging tapped openings 28 in the rim portion of said member, as illustrated in Figs. 2 and 4. In order to maintain the flange plate 22 and the coupling member 14 in alignment for attachment by the screws 26, the plate may be provided with several dowel pins 30.

It will be noted that the lateral and end faces of the teeth 20 of the female coupling member 14 are covered by an opposed pair of similar gibs 32 and 34, which gibs or gib means are generally U-shaped in longitudinal section. The outturned or driving faces of the gibs 32 and 34 are formed with longitudinal hardened channels 36 and 38, respectively. These elongated channels 36 and 38 are rectangular in cross section and extend axially of the coupling 10. A spaced pair of screws 40, 40 are countersunk and passed through the end portions 42 of gib means 32 and the end portions 44 of gib means 34 and tapped openings in the corresponding tooth ends to mount the gibs on the several teeth 20. Each screw 40 passes through an elongated opening 46 in the end portion of its gib, and these openings extend in a direction perpendicular to the respective faces of the teeth 20 so that the bearing surfaces or channels 36 or 38 may be given a corresponding adjustment.

In a generally similar manner the spaced teeth 18 of the male coupling member 12, which are arranged in driving relation to the teeth 20 of member 14, are each faced with an opposed pair of gibs 48 and 50, also generally U-shaped in longitudinal section and formed and arranged to cover the driving faces and ends of said teeth. As best illustrated in Fig. 1, the gibs 48 and 50 are formed to provide outturned channels 52 and 54, respectively, extending axially of the coupling 10 for retaining a ball bearing insert strip 56. The ball bearing attaching means includes the extended strip 56, spaced ball bearings 58 retained therein, and an ear 60 extending at right angles from each end of the strip 56. The gibs or mounting means 48 and 50 for the ball bearing assemblies have their ends formed with recesses 62 adjacent the ends of channels 52 and 54 for receiving the attaching ears 60, which are detachably secured by countersunk machine screws 64 passing therethrough and into the gibs.

As shown best in Fig. 2, the planes of engagement between the lateral surfaces of the tooth members 18 and 20 are radial and along common diameters.

The manner in which the gibs 32 and 34 having the hardened bearing surfaces 36 and 38 may be adjusted to maintain the design clearances and compensate for wear is shown in connection with the sectioned tooth which is uppermost in Fig. 1. In this instance a shim 66 in the form of a flat metal strip of uniform thickness has been inserted between the inner faces of the corresponding gibs and the lateral faces of a tooth 20 of the female coupling member 14. It will now be understood that the slots 46 in the end portions of these gibs 32 and 34 are intended to accommodate such adjustment and that the screws 40 will hold the gibs securely in this adjusted relation.

While it would be possible to provide the same type of adjustment for the gibs 48 and 50 on the teeth 18 of the male coupling member 12, it is more practical to accommodate any wear in the bearing assemblies by detaching the bearing strip 56 and replacing it with a strip carrying a new set of ball bearings 58.

The nature of the means for providing at least partial rolling and friction reducing contact between the interfitting teeth 18 and 20 on the coupling members 12 and 14 will now be wholly apparent. The spacing provided by the ball bearings 58 and the opposed and aligned hardened surfaces of the channels 36 or 38 also makes it possible to lubricate the bearing surfaces very efficiently.

The gibs 32 and 34 with their adjusting and securing means in the form of end slots 46 and fastening screws 40 permit the adjustment of any tooth face on which they are mounted to accommodate for wear by the simple addition of one or more shims 66. The screw attached gibs 48 and 50 on the mating teeth provide a very convenient means for mounting the detachable bearing insert strips 56, which may be readily replaced when required because of wear or damage.

The design clearances referred to herein contemplate an operative relation of the two clutches 12 and 14 in which there is a small longitudinal space between the adjacent faces of the coupling means 16 and the male coupling member 12, as well as moderate spacing between the end surfaces of the male and female teeth 18 and 20 and the corresponding surfaces between the roots of said teeth.

There has thus been provided an anti-friction, adjustable coupling which is less subject to wear, can be lubricated more efficiently, minimizes the expense of repairs, and prevents costly loss of machinery operating time. This jaw type coupling makes it possible to maintain the design clearances throughout the entire period of coupling use by the simple expedient of shimming. It is also very important from a practical standpoint that the freer floating movement afforded by the coupling of this invention greatly reduces the chance of expensive injury to the turbine rotor and reduction gear pinion when coupled therewith. It will also be appreciated that couplings embodying the principle of this invention can be used to advantage with various other rotary auxiliary machinery.

While a preferred embodiment of this invention has been described in detail for purposes of illustration, it will be understood by those skilled in the art that numerous changes can be made in the details of construction and arrangement of parts without departing from the principles of the invention as defined in the appended claims.

Having thus described my invention, what I claim as novel and desire to secure by Letters Patent of the United States is:

1. In a jaw type coupling having a pair of coaxial members with intermeshed teeth arranged in driving relation, gibs mounted on the opposite faces of the teeth of one of said members, each of said gibs being formed to provide an outturned channel extending axially thereof, means adjustably securing the channeled gibs to the respective teeth for adjustment of each channel perpendicularly to the plane of the tooth face on which it is mounted, other gibs mounted on the opposite faces of the teeth of the other of said members, and an extended ball bearing assembly detachably mounted axially in the outer side of each of said other gibs and constructed and arranged for engagement of the ball bearings with the channels of the gibs on the teeth of the said one member.

2. In a jaw type coupling having a pair of coaxial members with intermeshed radial teeth arranged in driving relation, gibs mounted on the opposite faces of the teeth of one of said members, each of said gibs being formed to provide an outturned channel extending axially thereof, screw means adjustably securing the channeled gibs to the ends of the respective teeth for adjustment of each channel perpendicularly to the plane of the tooth face on which it is mounted, other gibs mounted on the opposite faces of the teeth of the other of said members, and an extended ball bearing assembly detachably mounted axially in the outer side of each of said other gibs and constructed and arranged for engagement of the ball bearings with the channels of the gibs mounted on the teeth of the said one member.

3. In combination with a jaw type coupling having male and female members with intermeshed teeth in driving relation, generally U-shaped gibs fitted over the opposite drive faces and ends of the teeth of the female member, each of said gibs being formed to provide a hardened outturned surface extending parallel to the common axis of said members, each of said gibs being formed with slotted openings in the portions extending over the ends of the teeth, said slotted openings being disposed perpendicular to the respective teeth drive faces, screw means passing through said slotted openings and securing said gibs to their respective teeth, other generally U-shaped gibs fitted over the opposite drive faces and ends of the teeth of the male member, means securing said other gibs to their respective teeth by the portions extending over the ends thereof, each of said other gibs being formed to provide a channel portion arranged in aligned opposition to a respectively adjacent outturned surface of a gib secured to a tooth of said female member, an extended ball bearing assembly fitted into the channel of each of said other gibs, each of said ball bearing assemblies being formed with an ear portion at each end extending over the adjacent end of the corresponding other gib, and readily detachable means securing said ear portions to the respective ends of said other gib.

4. In combination with a jaw type coupling having male and female members with intermeshed radial teeth in driving relation having planes of engagement along common diameters, generally U-shaped gibs fitted over the opposite drive faces and ends of the teeth of the female member, each of said gibs being formed to provide a hardened outturned channel extending parallel to the common axis of said members, each of said gibs being formed with slotted openings in the portions extending over the ends of the teeth, said slotted openings being disposed perpendicular to the respective teeth drive faces, screw means passing through said slotted openings and securing said gibs to their respective teeth, other generally U-shaped gibs fitted over the opposite drive faces and ends of the teeth of the male member, screw means securing said other gibs to their respective teeth by the portions extending over the ends thereof, each of said other gibs being formed to provide a channel portion arranged in aligned opposition to the respectively adjacent channel of a gib secured to a tooth of said female member, and an extended ball bearing assembly mounted in the channel of each of said other gibs.

5. In combination with a jaw type coupling having first and second coaxial drive members with intermeshed teeth, gib means mounted on the opposite drive faces of the teeth of the first member, each of said gib means being provided with an axially extending hardened surface, means adjustably securing said hardened surface gibs to the respective teeth of the first member for adjustment of each hardened surface perpendicularly to the plane of the tooth drive face on which it is mounted, extended ball bearing assembly means arranged on the opposite drive faces of each of the teeth of the second member, and means detachably securing the ball bearing assembly means to the respective teeth of the second member in opposed alignment with the adjacent hardened surfaces of the gib means.

6. In combination with a jaw type coupling having first and second coaxial drive members with intermeshed radial teeth, gib means mounted on the opposite drive faces of the teeth of the first member, each of said gib means being provided with an axially extending hardened surface, screw means adjustably securing said hardened surface gibs to the respective teeth of the first member for adjustment of each hardened surface perpendicularly to the plane of the tooth drive face on which it is mounted, extended ball bearing assembly means arranged on the opposite drive faces of each of the teeth of the second member, and screw means detachably securing the ball bearing assembly means to the respective teeth of the second member in opposed alignment with the adjacent hardened surfaces of the gib means.

7. In combination with a jaw type coupling having a pair of coaxial drive members with intermeshed teeth, a first set of gib means mounted on the opposite drive faces of the teeth of one member, each of said gib means being provided with an axially extending hardened surface, means securing said hardened surface gibs to the respective teeth of said one member for adjustment of each hardened surface perpendicularly to the plane of the tooth drive face on which it is mounted; a second set of gib means mounted on the opposite drive faces of the teeth of the other member, an extended ball bearing assembly detachably mounted axially on the outer side of each of the second set of gib means in opposed alignment with the respectively adjacent hardened surfaces of the first set of gib means, and shim means between one of the first set of gib means and the tooth drive face on which it is mounted.

BARTLETT A. BECK, Sr.

REFERENCES CITED

The following references are of record in the file of this patent:

UNITED STATES PATENTS

| Number | Name | Date |
|---|---|---|
| 754,066 | Hoffmann | Mar. 8, 1904 |
| 1,846,019 | Bangser | Feb. 23, 1932 |
| 2,060,473 | Schumb | Nov. 10, 1936 |

FOREIGN PATENTS

| Number | Country | Date |
|---|---|---|
| 172,944 | Germany | 1906 |